(12) United States Patent
Jang et al.

(10) Patent No.: US 9,496,804 B2
(45) Date of Patent: Nov. 15, 2016

(54) INVERTER-CHARGER COMBINED DEVICE FOR ELECTRIC VEHICLES AND METHOD THEREOF

(71) Applicant: LSIS CO., LTD., Anyang-si, Gyeonggi-do (KR)

(72) Inventors: Byung Woon Jang, Anyang-si (KR); Chun Suk Yang, Seongnam-si (KR)

(73) Assignee: LSIS CO., LTD., Anyang-si (KR)

( * ) Notice: Subject to any disclaimer, the term of this patent is extended or adjusted under 35 U.S.C. 154(b) by 804 days.

(21) Appl. No.: 13/894,152

(22) Filed: May 14, 2013

(65) Prior Publication Data
US 2013/0307333 A1 Nov. 21, 2013

(30) Foreign Application Priority Data

May 21, 2012 (KR) .................. 10-2012-0053559

(51) Int. Cl.
*H02M 7/72* (2006.01)
*B60L 11/18* (2006.01)
*H02J 7/00* (2006.01)
*H02J 7/02* (2016.01)

(52) U.S. Cl.
CPC ............ *H02M 7/72* (2013.01); *B60L 11/1814* (2013.01); *H02J 7/0013* (2013.01); *H02J 7/022* (2013.01); *H02J 7/0018* (2013.01); *Y02T 10/7005* (2013.01); *Y02T 10/7055* (2013.01); *Y02T 10/7072* (2013.01); *Y02T 90/127* (2013.01); *Y02T 90/14* (2013.01); *Y10T 307/367* (2015.04)

(58) Field of Classification Search
CPC ........... B60L 11/1844; B60L 11/1848; Y10T 307/367

USPC .......................................................... 307/26
See application file for complete search history.

(56) References Cited

U.S. PATENT DOCUMENTS

| 2004/0050599 | A1* | 3/2004 | Krzesicki ................. B60K 6/44 180/65.225 |
| 2006/0145542 | A1 | 7/2006 | Kusubayashi |
| 2009/0230774 | A1 | 9/2009 | Kaster et al. |
| 2011/0169449 | A1 | 7/2011 | King et al. |

FOREIGN PATENT DOCUMENTS

| CN | 1717346 | 1/2006 |
| EP | 2113410 | 11/2009 |

(Continued)

OTHER PUBLICATIONS

Japan Patent Office Application Serial No. 2013-107161, Office Action dated Apr. 1, 2014, 4 pages.

(Continued)

*Primary Examiner* — Fritz M Fleming
(74) *Attorney, Agent, or Firm* — Lee, Hong, Degerman, Kang & Waimey

(57) ABSTRACT

Disclosed is an inverter-charger combined device for electric vehicles configured to drive a 3-phase motor by charging a high voltage battery in case of charging mode, and switching a power of the high voltage battery in case of operation mode, the device including a first power supply unit for supplying a power to drive a switching unit of the rectifier, and a second power supply unit for supplying a power to drive a switching unit of the inverter, where the first power supply unit and the second power supply unit are configured to independently supply a power.

19 Claims, 4 Drawing Sheets

(56) References Cited

FOREIGN PATENT DOCUMENTS

| JP | 08-107606 | 4/1996 |
|----|-----------|--------|
| JP | 08-126122 | 5/1996 |
| JP | 09-233708 | 9/1997 |
| JP | 2000-312444 | 11/2000 |
| JP | 2010-045961 | 2/2010 |
| JP | 2011-072081 | 4/2011 |
| KR | 10-2007-0023955 | 3/2007 |
| WO | 2009/034877 | 3/2009 |
| WO | 2011/128750 | 10/2011 |

OTHER PUBLICATIONS

European Patent Office Application Serial No. 13168054.8, Search Report dated Nov. 22, 2013, 6 pages.
Korean Intellectual Property Office Application Serial No. 10-2012-0053559, Office Action dated Aug. 28, 2013, 4 pages.
The State Intellectual Property Office of the People's Republic of China Application Serial No. 201310274454.3, Office Action dated Nov. 2, 2014, 7 pages.

* cited by examiner

INVERTER-CHARGER COMBINED DEVICE FOR ELECTRIC VEHICLES AND METHOD THEREOF

CROSS-REFERENCE TO RELATED APPLICATIONS

Pursuant to 35 U.S.C.§119 (a), this application claims the benefit of earlier filing date and right of priority to Korean Patent Application No.10-2012-0053559, filed on May 21, 2012, the contents of which are hereby incorporated by reference in their entirety.

BACKGROUND OF THE INVENTION

1. Field of the invention

The present disclosure relates to an inverter-charger combined device for electric vehicles and a control method thereof.

2. Description of Related Art

Generally, an electric vehicle includes a high voltage battery charged with a high voltage, e.g., approximately 72 volts, a 3-phase motor driven by a power charged in the high voltage battery to run an electric vehicle, and an inverter for driving the 3-phase motor. However, the driving of the 3-phase motor using the power charged in the high voltage batter is limited by capacity of the high voltage battery.

That is, in a case the power remaining in the high voltage battery of the electric vehicle drops below a predetermined level, the 3-phase motor cannot be driven any longer. Hence, the electric vehicle is equipped with a high voltage charger to charge the high voltage battery. The high voltage charger may be largely classified to two types, i.e., a slow speed charger using a household single AC power, and a high speed charger using a transmission and distribution 3-phase AC power.

Meanwhile, each of the inverter, the high voltage charger and the low voltage charger is separately installed, such that it takes lots of time and man power to respectively install the inverter, the high voltage charger and the low voltage charger on the electric vehicle. Thus, an inverter-charger combined device for electric vehicle is being developed that is combined of the inverter, the high voltage charger and the low voltage charger in one integrated configuration.

However, a power unit applied to a switching element of the inverter-charger combined device is configured in a common power source, and there is no sufficient measure to cope with a situation where the power unit is out of order.

SUMMARY OF THE INVENTION

Exemplary aspects of the present disclosure are to substantially solve at least the above problems and/or disadvantages and to provide at least the advantages as mentioned below. Thus, the present disclosure is directed to provide an inverter-charger combined device for electric vehicles configured to individually mount a power unit applied to a switching element of the inverter-charger combined device to enable a stable operation even during partial failure of the power unit, and a control method thereof.

Technical problems to be solved by the present disclosure are not restricted to the above-mentioned descriptions, and any other technical problems not mentioned so far will be clearly appreciated from the following description by skilled in the art.

In one general aspect of the present invention, there is provided an inverter-charger combined device for electric vehicles configured to drive a 3-phase motor by charging a high voltage battery in case of charging mode, and switching a power of the high voltage battery in case of operation mode, the device comprising:

a rectifier providing a power for charging the high voltage by rectifying an inputted AC power;

an inverter receiving the AC power rectified by the rectifier via the 3-phase motor in case of charging mode to rectify the AC power to a DC power in case of charging mode, and converting the DC power charged in the high voltage battery in case of operation mode to driving the 3-phase motor; and a power supply unit supplying a power to drive the rectifier and the inverter.

Preferably, but not necessarily, the device may further comprise: a low voltage rectifier for supplying a low voltage DC power to a load including a controller; and a controller configured to control the rectifier, the inverter and the low voltage rectifier.

Preferably, but not necessarily, the power supply unit may include a first power supply unit for supplying a power for driving a switching unit of the rectifier, and a second power supply unit for supplying a power for driving a switching unit of the inverter.

Preferably, but not necessarily, each of the first and second power supply units may be configured to independently supply a power.

Preferably, but not necessarily, the device may further comprise: a first switching unit for selecting the first power supply unit or the second power supply unit to supply a power to drive the switching unit of the rectifier; and a second switching unit for selecting the first power supply unit or the second power supply unit to supply a power to drive the switching unit of the inverter.

Preferably, but not necessarily, the first switching unit may be embedded in the first power supply unit, and the second switching unit may be embedded in the second power supply unit.

Preferably, but not necessarily, the first switching unit and the second switching unit may be configured to select the first power supply unit or the second power supply unit in response to an operation state of the first power supply unit or the second power supply unit.

Preferably, but not necessarily, the first switching unit and the second switching unit may be configured to supply a power to the switching unit of the rectifier and the switching unit of the inverter from the second power supply unit by selecting the second power supply unit in case of failure at the first power supply unit, and to supply a power to the switching unit of the rectifier and the switching unit of the inverter from the first power supply unit by selecting the first power supply unit in case of failure at the second power supply unit.

In another general aspect of the present invention, there is provided a control method for an inverter-charger combined device for electric vehicles configured to drive a 3-phase motor by charging a high voltage battery in case of charging mode, and switching a power of the high voltage battery in case of operation mode, the method comprising:

selecting a switch of a rectifier rectifying an AC power inputted for providing a power for charging the high voltage battery in case of charging mode;

supplying a driving power to the switch of the rectifier for rectifying the inputted AC power;

supplying the AC power rectified by the rectifier to the 3-phase motor; and receiving the rectified AC power from the 3-phase motor for rectification to a DC power, and charging the high voltage battery.

In still another general aspect of the present invention, there is provided a control method for an inverter-charger combined device for electric vehicles configured to drive a 3-phase motor by charging a high voltage battery in case of charging mode, and switching a power of the high voltage battery in case of operation mode, the method comprising:

selecting a switch of an inverter supplying a power to drive the 3-phase motor from the charged high voltage battery in case of operation mode;

supplying a DC power charged in the high voltage battery to the switch of the inverter; and driving the 3-phase motor by converting the DC power to a 3-phase DC power.

In an advantageous effect, the inverter-charger combined device for electric vehicles can be normally operated using other remaining power supply units even if one power supply unit fails, by separately configuring a power supply unit of a rectifier and a power supply unit of an inverter, in a case all functions are inoperative if a common power supply unit to the rectifier and the inverter is used and becomes inoperative.

BRIEF DESCRIPTION OF THE DRAWINGS

The teachings of the present disclosure can be readily understood by considering the following detailed description in conjunction with the accompanying drawings, in which:

FIG. 1b is a block diagram illustrating a configuration of FIG. 1a;

DETAILED DESCRIPTION OF THE INVENTION

Figure 1A:
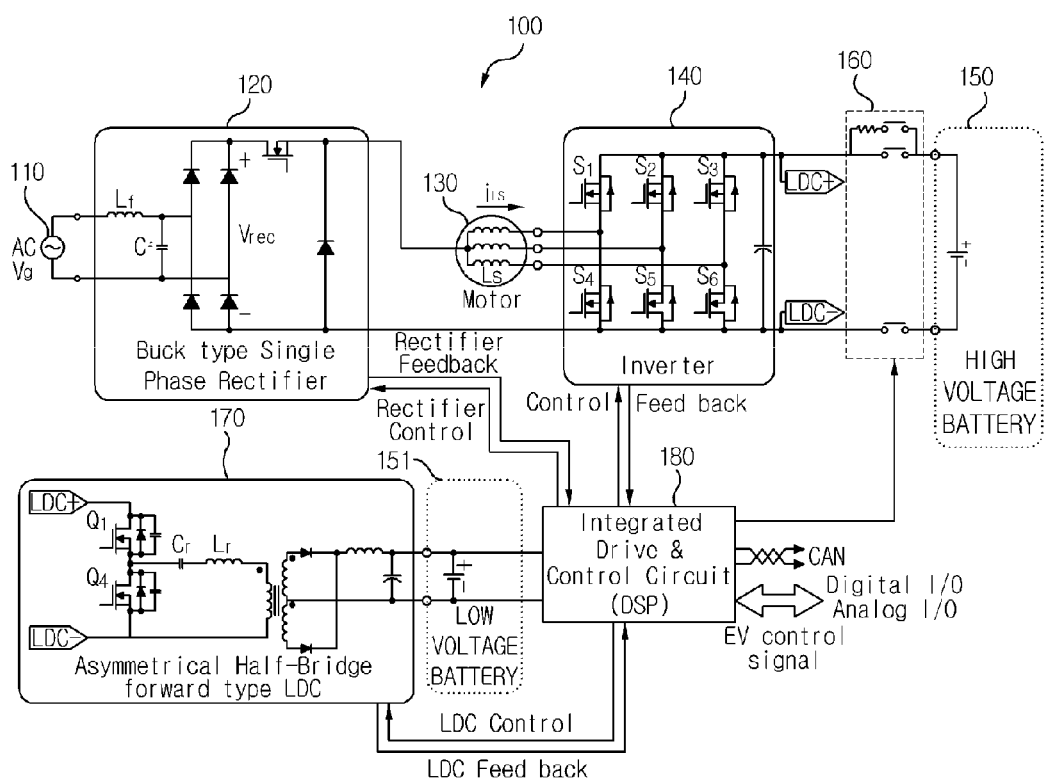
FIG. 1a is a block diagram illustrating a configuration of an inverter-charger combined device for electric vehicles according to an exemplary embodiment of the present disclosure.

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Now, exemplary embodiments of the present disclosure will be explained in detail together with the figures.

The inverter-charger combined device (100) for electric vehicles according to an exemplary embodiment of the present disclosure may include a rectifier rectifying an AC power, a low voltage rectifier (170) for supplying a low voltage DC power to a load including a controller, a motor (130) for driving an electric vehicle, an inverter (140) driving the motor and supplying a charged power to a high voltage battery (160), a controller (180) for controlling the rectifier, the low voltage rectifier and the inverter.

The rectifier (120) may provide a power for charging the high voltage battery (160) by rectifying a single AC power (110).

The low voltage rectifier (170) for supplying a low voltage DC power may receive a DC power (LDC+, LDC−) rectified by the inverter (140), perform a voltage drop and provide the voltage-dropped power to a device or an element requiring a low voltage (e.g., 12V) DC power inside the device (100).

Furthermore, the low voltage rectifier (170) may charge a low voltage battery (151) via a transformer. The low voltage rectifier (170) may be analogous to that mounted on a conventional vehicle.

The motor (130) is provided to drive an electric vehicle and may function to transmit an AC power rectified by a single phase rectifier to an inverter side during a charging mode. Furthermore, the motor (130) may be driven by being supplied with an AC power generated by switching, by an inverter, a power charged in a battery during an operation mode.

The inverter (140) may function to rectify a DC power by receiving an AC power rectified by a single phase rectifier from a 3-phase motor to a DC power. The inverter (140) may function to drive a 3-phase motor by converting a DC power charged in a battery to a 3-phase AC power during an operation mode.

The controller (180) may function to perform an overall control of elements included in the device (100). The controller (180) may control a switching element configured to disconnect a connection between the rectifier (120) and the motor (130) during an operation mode. For example, the switching element may be a switching unit (SW) inside the rectifier (120).

The controller (180) may control operations of the rectifier (120), the low voltage rectifier (170) and the inverter (140). Furthermore, the controller (180) may control an additional function of an electric vehicle (EV).

Meanwhile, in a case the inverter-charger combined device (100) for electric vehicles is operated under an operation mode or a charging mode, a driving power must be supplied to each switching unit (S1 to S6) of the inverter (140) and the switching unit (SW) of the rectifier (120), details of which will be described with reference to FIG 1a.

Figure 1B:
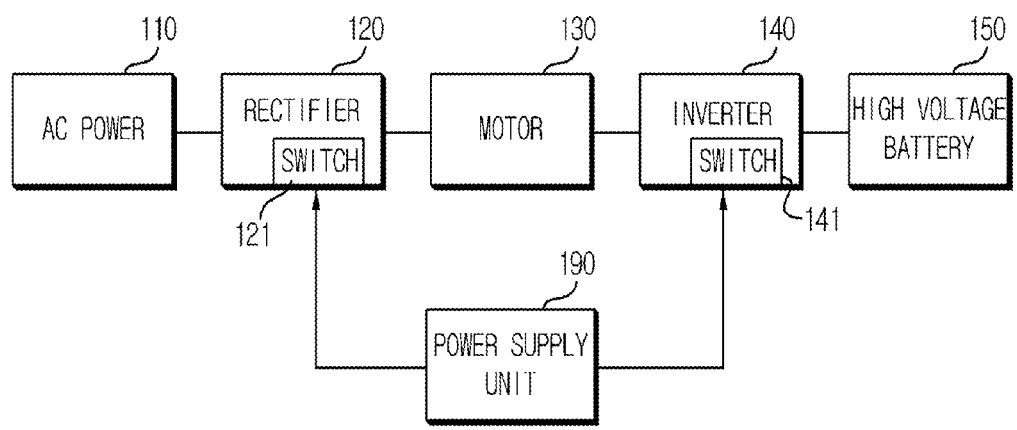

FIG. 1b is a schematic block diagram illustrating a configuration of FIG. 1a. The low voltage rectifier (170) and the controller (180) illustrated in the lower part of FIG. 1b will be omitted in explanation for brevity of explanation and easy understanding.

Referring to FIG. 1b, a power supply unit (190) is mounted on the rectifier (120) and the inverter (140) for supplying a power to controllably drive a switching unit mounted inside the rectifier (120) and the inverter (140). The power supply unit (190) may provide a power for driving the rectifier (120) and the switching unit of the inverter (140).

However, as described in the foregoing, the power supply unit (190) in FIG. 1b is a common element for the rectifier (120) and the inverter (140), such that in a case the power supply unit (190) fails to operate normally, that is, if the power supply unit (190) is inoperative, there is a problem in which the inverter-charger combined device (100) cannot be operated normally. A measure to solve the problem will be described later.

Figure 2A:
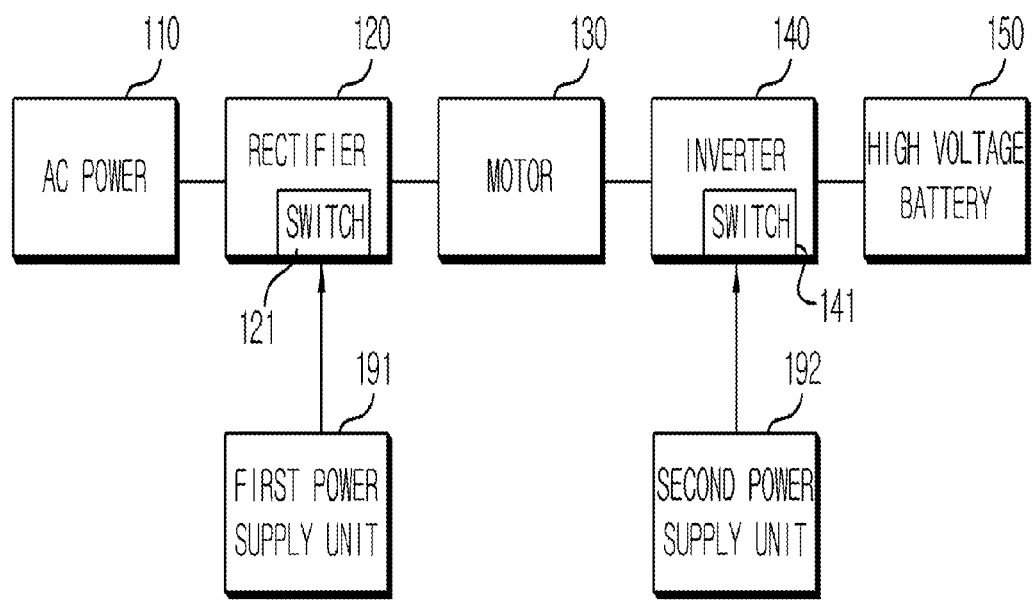
FIG. 2a is a block diagram illustrating an inverter-charger combined device for electric vehicles according to an exemplary embodiment of the present disclosure.

FIG. 2a is a block diagram illustrating an inverter-charger combined device for electric vehicles according to an exemplary embodiment of the present disclosure.

Referring to FIG. 2a, the inverter-charger combined device (100) for electric vehicles according to an exemplary embodiment of the present disclosure may include two power supply units, that is, a first power supply unit (191) and a second power supply unit (192).

The first power supply unit (191) is to provide a driving power of a switching unit of the rectifier (120), and the second power supply unit (192) is to provide a driving power of a switching unit of the inverter (140).

The first power supply unit (191) and the second power supply unit (192) may operate independently and may independently provide a power to the switching unit of the rectifier (120) and the switching unit of the inverter (140). That is, even if any one of the first power supply unit (191) and the second power supply unit (192) develops a failure, the remaining other power supply unit is not affected at all.

Furthermore, a switching unit may be interposed between the first power supply unit (191) and the switching unit of the rectifier (120) or between the second power supply unit (192) and the switching unit of the inverter (140). The switching unit for selecting the power supply unit may select the first power supply unit (191) or the second power supply unit (192) in response to operation state of the first power supply unit (191) or the second power supply unit (192), or may be connected to the switching unit of the rectifier (120) or the switching unit of the inverter (140).

The operational control of the switching unit may be implemented by the abovementioned controller (180), or may be implemented by separate control means (not shown) inside the first power supply unit (191) or the second power supply unit (192) for operational control of the switching unit. The operation of the switching unit will be described in detail in the later explanation.

Figure 2B:
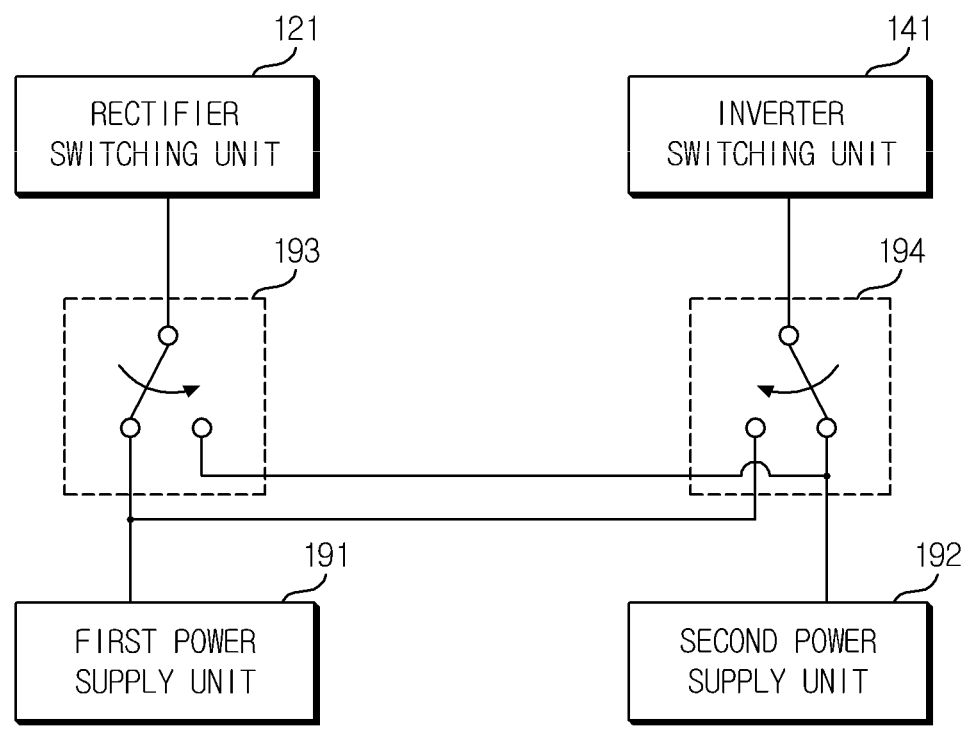
FIG. 2b is a block diagram illustrating a configuration of a power supply unit in an inverter-charger combined device for electric vehicles according to an exemplary embodiment of the present disclosure.

FIG. 2b is a block diagram illustrating a configuration of a power supply unit in an inverter-charger combined device for electric vehicles according to an exemplary embodiment of the present disclosure.

Referring to FIG. 2a, the inverter-charger combined device for electric vehicles according to an exemplary embodiment of the present disclosure may include two power supply units, that is, the first power supply unit (191) and the second power supply unit (192). Furthermore, these power supply units are respectively connected to a switching unit (121) of the rectifier and to a switching unit (141) of the inverter for supply of power thereto. Of course, the connection relationship and power supply for driving means a connection relationship and power supply at the default state, and these connection relationships and power supply may be different from a case where the power supply units (191, 192) are defaulted.

Basically, the inverter-charger combined device for electric vehicles according to an exemplary embodiment of the present disclosure is configured in such a manner that a driving power is supplied to the switching unit (121) of the rectifier (120) and to the switching unit (141) of the inverter (140) via mutually different power supply units. In other words, as explained before, during the default state, the first power supply unit (191) may supply a driving power to the switching unit (121) of the rectifier (120) and the second power supply unit (192) may supply a driving power to the switching unit (141) of the inverter (140).

However, in a case the first power supply unit (191) is not operating normally to disable to supply an appropriate power to the switching unit (121, SW) of the rectifier (120), the combined device (100) in FIG. 1 cannot perform a charging operation (or a charging mode) of the high voltage battery (150), and only the driving (or driving mode) of the motor (130) can be performed via a power charged in the high voltage battery (150). Thus, under this circumstance, in a case a user or the controller (180) determines that the combined device must be operated under a charging mode, the combined device comes to be in an inoperative state.

Furthermore, in a case the second power supply unit (192) is not operating normally to disable to supply an appropriate power to the switching unit (141, S1 to S6) of the inverter (140), the combined device (100) cannot perform the charging operation of the high voltage battery (150) and cannot drive the motor (130) via the power charged in the high voltage battery (150), because the inverter (140) is not operating normally.

In order to solve the problems thus explained, the inverter-charger combined device for electric vehicles according to an exemplary embodiment of the present disclosure may use a first switching unit (193) and a second switching unit (194).

Referring to FIG. 2b, although it is depicted that the first switching unit (193) and the second switching unit (194) are mounted separately from the first power supply unit (191) and the second power supply unit (192), the first switching unit (193) and the second switching unit (194) may be embedded in the first power supply unit (191) and the second power supply unit (192).

In a case the first power supply unit (191) fails to operate normally, a driving power cannot be supplied to the switching unit (121) of the rectifier normally, such that the first switching unit (193) may select the second power supply unit (192). Furthermore, in a case the second power supply unit (192) fails to operate normally, a driving power cannot be supplied to the switching unit (141) of the inverter normally, such that the second switching unit (194) may select the first power supply unit (191).

As apparent from the foregoing, the control of the switching operation of the first switching unit (193) and the second switching unit (194) may be performed by control means embedded inside the first and second power supply units (191, 192) or by the controller (180).

The above-mentioned inverter-charger combined device for electric vehicles and the control method thereof according to the exemplary embodiments of the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. An inverter-charger device configured to charge a high voltage battery during a charging mode and to drive a 3-phase motor by switching power of the high voltage battery during an operation mode, the device comprising:
   a rectifier providing power for charging the high voltage battery by rectifying input AC power;
   an inverter receiving the rectified AC power via the 3-phase motor during the charging mode and rectifying the AC power to DC power and converting DC power charged in the high voltage battery during the operation mode to drive the 3-phase motor; and
   a power supply unit supplying power to drive the rectifier and the inverter, the power supply unit comprising:
   a first power supply unit supplying power for driving a switching unit of the rectifier; and
   a second power supply unit supplying power for driving a switching unit of the inverter.

2. The device of claim 1, further comprising:
a low voltage rectifier supplying low voltage DC power to a load including a controller, the controller controlling the rectifier, the inverter and the low voltage rectifier.

3. The device of claim 1, wherein each of the first and second power supply units independently supplies power.

4. The device of claim 1, further comprising:
a first switching unit selecting the first power supply unit or the second power supply unit to supply power to drive the switching unit of the rectifier; and
a second switching unit selecting the first power supply unit or the second power supply unit to supply power to drive the switching unit of the inverter.

5. The device of claim 4, wherein:
the first switching unit is embedded in the first power supply unit; and
the second switching unit is embedded in the second power supply unit.

6. The device of claim 4, wherein the first switching unit and the second switching unit select the first power supply unit or the second power supply unit in response to an operation state of the corresponding first power supply unit or second power supply unit.

7. The device of claim 4, wherein the first switching unit and the second switching unit further:
select the second power supply unit to supply power to the switching unit of the rectifier and the switching unit of the inverter if the first power supply unit fails; and
select the first power supply unit to supply power to the switching unit of the rectifier and the switching unit of the inverter if the second power supply unit fails.

8. A control method for an inverter-charger device configured to charge a high voltage battery during a charging mode and to drive a 3-phase motor by switching power of the high voltage battery during an operation mode, the method comprising:
selecting a switch of a rectifier during the charging mode, the rectifier rectifying input AC power for charging the high voltage battery;
supplying power from a first power supply unit to the switch of the rectifier for rectifying the input AC power;
supplying the rectified AC power to the 3-phase motor;
receiving the rectified AC power via the 3-phase motor for rectification to DC power, the rectified AC power received by an inverter having a switch, the switch supplied with power from a second power supply unit; and
charging the high voltage battery using the rectified DC power,
wherein the first power supply unit is connected to the switch of the rectifier to supply power in a default state, and
wherein the second power supply unit is connected to the switch of the inverter to supply power in the default state.

9. A control method for an inverter-charger device configured to charge a high voltage battery during a charging mode and to drive a 3-phase motor by switching power of the high voltage battery during an operation mode, the method comprising:
disconnecting the 3-phase motor from a rectifier supplying rectified AC power to the 3-phase motor by controlling a switch of the rectifier, the switch supplied with power from a first power supply unit;
selecting a switch of an inverter during the operation mode, the inverter supplying power from the charged high voltage battery to the 3-phase motor, the switch of the inverter supplied with power from a second supply unit,
supplying DC power from the high voltage battery to the switch of the inverter; and
driving the 3-phase motor by converting the DC power to 3-phase DC power,
wherein the first power supply unit is connected to the switch of the rectifier to supply power in a default state, and
wherein the second power supply unit is connected to the switch of the inverter to supply of power in the default state.

10. The method of claim 8, further comprising:
supplying low voltage DC power to a load via a low voltage rectifier; and
controlling the rectifier, the inverter and the low voltage rectifier.

11. The method of claim 8, further comprising independently supplying power via each of the first and second power supply units.

12. The method of claim 8, further comprising:
selecting the first power supply unit or the second power supply unit via a first switching unit to supply power to the switching unit of the rectifier; and
selecting the first power supply unit or the second power supply unit via a second switching unit to supply power to the switching unit of the inverter.

13. The method of claim 12, further comprising selecting the first power supply unit or the second power supply unit in response to an operation state of the corresponding first power supply unit or second power supply unit.

14. The method of claim 12, further comprising:
selecting the second power supply unit to supply power to the switching unit of the rectifier and the switching unit of the inverter if the first power supply unit fails; and
selecting the first power supply unit to supply power to the switching unit of the rectifier and the switching unit of the inverter if the second power supply unit fails.

15. The method of claim 9, further comprising:
supplying low voltage DC power to a load via low voltage rectifier; and
controlling the rectifier, the inverter and the low voltage rectifier.

16. The method of claim 9, further comprising independently supplying power via each of the first and second power supply units.

17. The method of claim 9, further comprising:
selecting the first power supply unit or the second power supply unit via a first switching unit to supply power to the switching unit of the rectifier; and
selecting the first power supply unit or the second power supply unit via a second switching unit to supply power to the switching unit of the inverter.

18. The method of claim 17, further comprising selecting the first power supply unit or the second power supply unit in response to an operation state of the corresponding first power supply unit or second power supply unit.

19. The method of claim 17, further comprising:
selecting the second power supply unit to supply power to the switching unit of the rectifier and the switching unit of the inverter if the first power supply unit fails; and
selecting the first power supply unit to supply power to the switching unit of the rectifier and the switching unit of the inverter if the second power supply unit fails.

* * * * *